(12) United States Patent
Cook et al.

(10) Patent No.: US 9,917,920 B2
(45) Date of Patent: Mar. 13, 2018

(54) SYSTEM AND METHOD OF RECIPROCAL DATA SHARING

(71) Applicant: XOR Data Exchange, Inc, Wimberley, TX (US)

(72) Inventors: Michael Cook, Wimberley, TX (US); Gregor R. Bonin, Austin, TX (US); Aaron Antonio Rodriguez, Austin, TX (US)

(73) Assignee: XOR DATA EXCHANGE, INC, Wimberley, TX (US)

( * ) Notice: Subject to any disclaimer, the term of this patent is extended or adjusted under 35 U.S.C. 154(b) by 354 days.

(21) Appl. No.: 14/630,148

(22) Filed: Feb. 24, 2015

(65) Prior Publication Data

US 2016/0248881 A1 Aug. 25, 2016

(51) Int. Cl.
| | |
|---|---|
| *H04L 29/08* | (2006.01) |
| *H04L 12/741* | (2013.01) |
| *H04L 12/707* | (2013.01) |
| *H04L 12/825* | (2013.01) |

(52) U.S. Cl.
CPC ............ *H04L 67/32* (2013.01); *H04L 45/22* (2013.01); *H04L 45/74* (2013.01); *H04L 47/25* (2013.01)

(58) Field of Classification Search
CPC ....... H04L 67/10; H04L 67/104; H04L 63/10; H04L 1/1874; H04L 47/25; H04L 5/0064; H04L 67/22
See application file for complete search history.

(56) References Cited

U.S. PATENT DOCUMENTS

| | | |
|---|---|---|
| 5,649,102 A | 7/1997 | Yamauchi et al. |
| 6,810,437 B1 | 10/2004 | Nihei |
| 6,850,990 B1 | 2/2005 | Howarth et al. |
| 6,879,964 B2 | 4/2005 | Sauter et al. |
| 7,099,919 B2 | 8/2006 | Kusumoto et al. |
| 7,167,842 B1 | 1/2007 | Josephson et al. |
| 7,337,138 B2 | 2/2008 | Sauter et al. |

(Continued)

OTHER PUBLICATIONS

Cook, Michael, System and Method of Permission-Based Data Sharing, Filing date: Dec. 10, 2014, U.S. Appl. No. 14/565,313.

(Continued)

*Primary Examiner* — Thomas Dailey
*Assistant Examiner* — Abderrahmen Chouat
(74) *Attorney, Agent, or Firm* — Cesari & Reed, LLP; R. Michael Reed

(57) ABSTRACT

Systems and methods are provided for implementing reciprocal data sharing in a data exchange system. Limitations may be placed on the amount of data an exchange member may access based on the amount of data that exchange member has contributed. The system may include determining a data contribution associated with a first member of the data exchange, determining a limit for the first member based on the data contribution, and providing data to the first member when the first member has not exceeded the limit. In some embodiments, there may be separate limits for each member of the data exchange, so that a first member may have different access limits when accessing data from a second member, data from a third member, and data from a fourth member. Further, the system may limit a requester to a type of data that corresponds to the type of data contributed.

20 Claims, 12 Drawing Sheets

(56) References Cited

U.S. PATENT DOCUMENTS

| | | |
|---|---|---|
| 7,395,197 B2 | 7/2008 | Nakamura |
| 7,587,501 B2 | 9/2009 | Stillion et al. |
| 7,849,021 B1 | 12/2010 | Nevarez |
| 7,937,362 B1* | 5/2011 | Lian ................. G06Q 10/00 707/622 |
| 8,335,734 B1 | 12/2012 | Sauter |
| 8,429,040 B2 | 4/2013 | Flake et al. |
| 8,560,456 B2 | 10/2013 | Williams |
| 8,832,705 B1 | 9/2014 | Berde |
| 2007/0061863 A1* | 3/2007 | Rajasekaran .......... G06Q 30/02 726/2 |
| 2010/0138612 A1 | 6/2010 | Wei |
| 2011/0131278 A1* | 6/2011 | Nieh ................... H04L 67/104 709/204 |
| 2014/0089230 A1 | 3/2014 | Kelety et al. |
| 2015/0089496 A1* | 3/2015 | Thankappan ......... G06F 9/5005 718/1 |

OTHER PUBLICATIONS

Cook, Michael, System and Method of Filtering Consumer Data, Filing Date: Dec. 10, 2014, U.S. Appl. No. 14/565,300.

\* cited by examiner

SYSTEM AND METHOD OF RECIPROCAL DATA SHARING

FIELD

This disclosure generally relates to data exchange systems, and more particularly to data exchange systems that selectively limit data sharing.

BACKGROUND

Data exchanges, such as credit bureaus, may capture data from multiple data owners (such as lenders, companies, and the like) and may provide data to data requesters. Since such data may be made available to a requester, data owners may be donating their customer lists and other competitive data to their competitors.

SUMMARY

In some embodiments, a system may include a memory device to store instructions that, when executed, cause a processor to receive a data request from a first member of a data exchange system, determine a data contribution associated with the first member, determine a data access limit for the first member based in part on the data contribution, and selectively provide results data to the first member in response to the data request based on the data access limit.

In another embodiment, a method may include receiving a data request from a first member of a data exchange system at a processor circuit, determining a data contribution associated with the first member based on first metadata stored to a database, determining a data access limit for the first member based in part on the data contribution, and selectively providing results data to the first member in response to the data request based on the data access limit.

In yet another embodiment, an apparatus may include a processor circuit configured to receive a data request from a first member of a data exchange system, determine a data contribution associated with the first member, including an amount of data the first member previously provided to the data exchange system, determine a data access limit for the first member based in part on the data contribution, the data access limit includes an amount of data to which the first member is permitted access in exchange for the data contribution, and selectively provide results data to the first member in response to the data request when the first member has not exceeded the data access limit.

DETAILED DESCRIPTION

Figure 1:
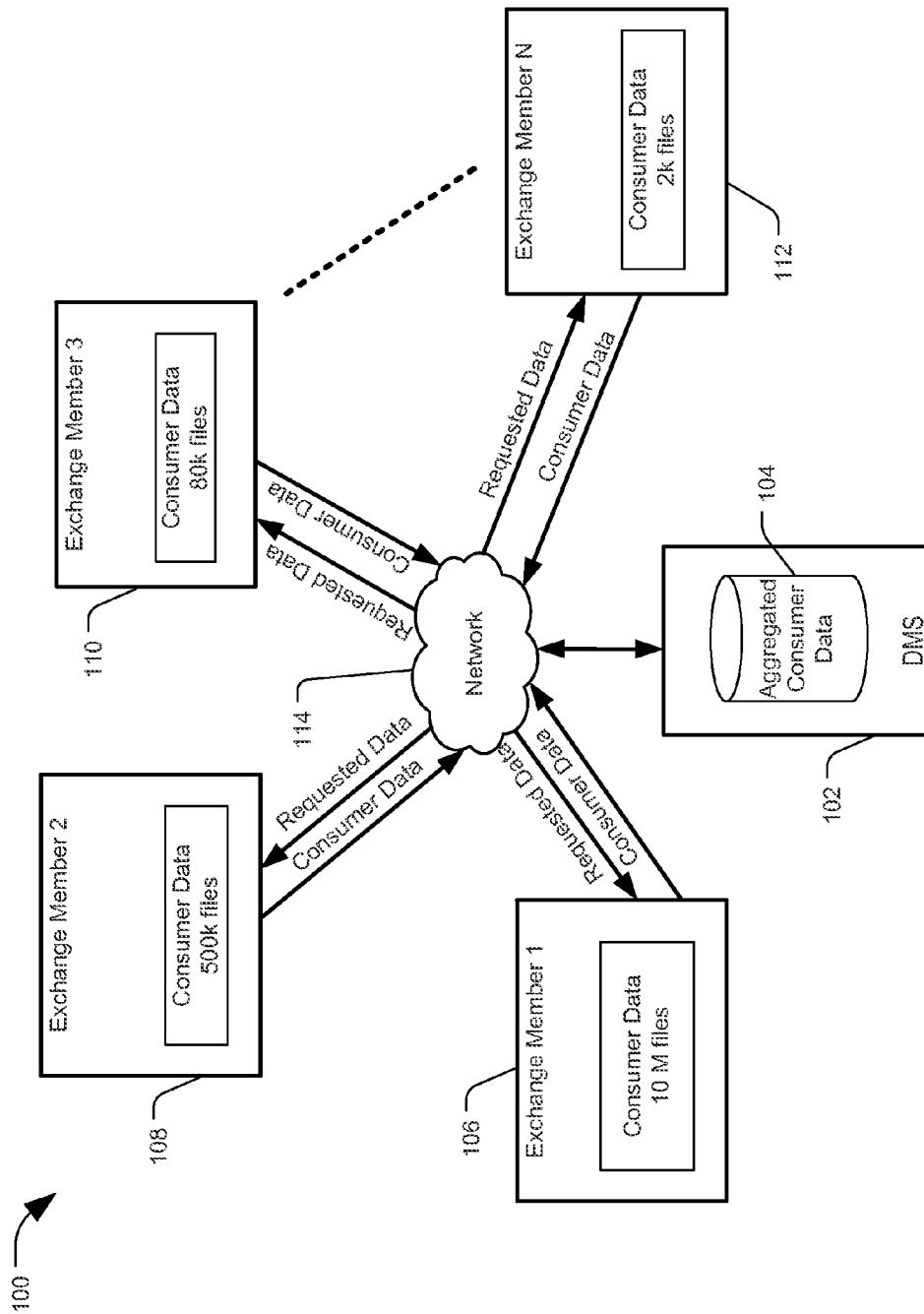
FIG. 1 is a block diagram of a system configured to provide reciprocal data sharing, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller circuit. In accordance with various embodiments, the methods and functions described herein may be implemented as one or more software programs running on a computing device, such as a tablet computer, a smartphone, a personal computer, a server, or any other computing device. Dedicated hardware implementations including, but not limited to, application specific integrated circuits, programmable logic arrays, and other hardware devices can likewise be constructed to implement the methods and functions described herein. Further, the methods described herein may be implemented as a device, such as a nonvolatile computer readable storage medium or memory device, including instructions that, when executed, cause a processor to perform the methods.

Data exchange consortiums may include multiple entities, which may share or contribute data for access by the constituent members. As used herein, "file," "data," or similar language may refer to any data element which may be contributed to the data exchange and searched or obtained from the data exchange, such as a complete collection of data or records about a particular customer, a single field of data (such as a customer address), other data, or any combination thereof. For example, companies such as retail stores, credit card companies, online retailers, credit bureaus, search engine providers, and other companies may collect data associated with their customers and users. The collected data may be used for marketing, determining buying habits, determining market trends, determining advertising effectiveness, monitoring credit, detecting fraud, performing other operations, or any combination thereof. Each company may also contribute its data to or share its collected data with the data exchange consortium. The aggregated data may be accessed by members of the consortium, or non-members or non-contributing members may pay for access to the aggregated data. Other embodiments are also possible.

In some data exchange systems, such as those in which constituent members may gain access to portions of the aggregated data based in part by sharing their own data, certain inequalities may arise. For example, some data exchange systems may operate on a "full reciprocity" or "give-to-get" arrangement, where donating any amount of data greater than zero to the exchange allows the donator to gain full access to the aggregated database. Full reciprocal models such as these may require that only one datum be contributed to unlock access to millions of data elements. A full reciprocity arrangement may be considered unbalanced or inequitable by some businesses, and those businesses may therefore avoid participating in such a data consortium. As an illustrative example, a single consortium may include a large business, which may have twenty million customers and associated data, and hundreds of small businesses, each of which may only have data related to thousands of customers or less. A large business may view membership in a consortium employing "full reciprocity" as inequitable, as each small business would receive full access to the large company's data in exchange for a much smaller contribution. By providing such a large number of data elements that may be available to unlimited searches and access by other members, including competing companies, the larger business may be effectively donating a competitive advantage that has been cultivated and developed through years of effort and with large investments of capital.

According to other embodiments of a data exchange system disclosed herein, data sharing and access may be based on a data valuation model, which may also be called a "reciprocal data sharing" model. A reciprocal data sharing model may measure the contributions of each member, and may control (filter or otherwise limit) the access to data for that member based on its contributions. In an illustrative non-limiting example, each member may be permitted to access 200% (or some other percentage or ratio) of the number of files contributed by that member. In this illustrative non-limiting example, if a member contributes 10,000 records, the member may be permitted to access 20,000 records of other members. In some embodiments, the member may access 20,000 records of another member, or 20,000 records total, which records may have been contributed by one or more other members. In some embodiments, each member (requester) may be permitted to access data contributed by other members in proportion to the amount of data shared by the requesting member, reducing the potential inequities in data sharing between members. In some embodiments, a requester may be permitted to access some percentage or ratio of the number of files contributed by the requester from each member of the data exchange. While the above examples have included a 2× multiplier or a 200% value, it should be appreciated that other values (integer or fractional) may be used. Other embodiments are also possible. Further, in some embodiments, the system may limit data access to an exchange member (requester) to the same type of data as that contributed by the requesting exchange member. Thus, the exchange member that contributes only names and addresses may retrieve only names and addresses from the database, and may further be limited to a proportion of the amount of data contributed by the requester.

In some embodiments, the system may include an interface to a network, such as the Internet. The interface may be coupled to one or more processors, which may be configured to receive a request for data and to selectively provide data to the requester in proportion to the amount of data contributed to the system by the requester. One possible illustrative example of the system is described below with respect to FIG. 1.

FIG. 1 is a block diagram of a system 100 including a data management system (DMS) 102 implementing reciprocal data sharing, in accordance with certain embodiments of the present disclosure. The DMS 102 may operate as a data exchange hub or center of a data exchange consortium, and may comprise one or more computing devices, network interfaces, processor circuits, software modules, operating rule sets, other components, or any combination thereof. The DMS 102 may receive and service requests for data from exchange members, and may receive data to add to the aggregated data of the exchange from one or more exchange members. The DMS 102 may include or be coupled to one or more databases 104 of aggregated data of the data exchange consortium. For example, the database 104 may store consumer data, scientific research data, financial transaction data, other data, or any combination thereof. The database 104 may also store metadata associated with the aggregated data, metadata associated with members of the data exchange, or other metadata elements. In some embodiments, the database 104 may store a data owner identifier with or associated with each datum.

System 100 may also include a plurality of data exchange members. In the example embodiment of FIG. 1, the system 100 includes "N" exchange members (where N is a positive integer), labeled as exchange member 106, exchange member 108, exchange member 110, and exchange member 112. Each exchange member 106, 108, 110, and 112 may communicate with the DMS 102, for example, via network 114. In some embodiments, network 114 may include one or more internets, intranets, local area networks (LANs), wide area networks (WANs), cellular networks, satellite networks, other networks, or any combination thereof.

Each exchange member 106, 108, 110, and 112 may contribute data to the database 104, and may request or retrieve data from the database 104. Each exchange member 106, 108, 110, and 112 may also have a different amount of data to contribute to the aggregated database 104. Further, each exchange member 106, 108, 110, and 112 may be a data owner of data stored in the database 104 by contributing such data to the system 100. For example, exchange member 106 may have ten million (10 M) data files; exchange member 108 may have five-hundred thousand (500 k) data files; exchange member 110 may have eighty-thousand (80 k) data files; and exchange member 112 may have two thousand (2 k) data files. DMS 102 may associate an exchange member with the data files contributed by that exchange member (e.g. using metadata associated with the data files or with the member), and the providing member may be considered the "data owner" of their contributed data stored in the database 104. In some embodiments, the DMS 102 may assign a data owner ID to each exchange member and may store the data owner ID with the contributed data in the database 104.

In embodiments of system 100 employing reciprocal data sharing, the DMS 102 may maintain information about the data contributed by each member, which information may include the amount of data, the type of data, other information, or any combination thereof. The information about the contributed data may be used to regulate the amount of data available to each member. In some embodiments, the DMS 102 may also maintain information regarding data sharing settings selected by each member. For example, each member may select sharing limits, thresholds, conditions, and other restrictions with respect to how that member's data may be shared with a second member based on the data contributions of the second member, and optionally based on data sharing settings of the second member.

Accordingly, when exchange member 108 submits a data query to the DMS 102, the DMS 102 may determine which data elements from database 104 may match the query to produce potential data results, and which exchange member is associated with each data element of the potential data results. The DMS 102 may then check the data contribution information for exchange member 108, and compare it against the data sharing settings of each member associated with the potential data results. The DMS 102 may then selectively filter the potential data results based on the data contribution information of the exchange member 108 to produce first results, which may be provided to the exchange member 108. In some embodiments, the DMS 108 may further filter the first results based on the data sharing settings of each data owner, and may selectively return the filtered results to exchange member 108. For example, the DMS 108 may have a maximum data reciprocity setting, such as 500% or five times the number of contributed files. So if a member that has contributed 10 k files performs a data search, the first results may be limited to 50 k files. Of those 50 k files, the DMS 108 may determine whether individual data owners for the 50 k files have set lower sharing limits (e.g., 200% limit vs. the amount of contributed files). So, if a given member contributed 30 k of the 50 k results and has a 2× sharing limit, only 20 k of the 30 k files may be provided to the requesting member. Some examples of sharing settings selectable by data owners may include limiting data sharing limits based on whether the requesting member is in a competing industry, based on an intended use of data being requested, based on whether the requesting member has made reciprocal data available, or based on other factors. In some embodiments, data owners may select different sharing settings for different types or categories of data (e.g., AFT personally identifiable information vs. non-personally identifiable information). Other embodiments are also possible.

As can be seen from the provided example embodiments, the DMS 108 may be configured to provide a reciprocal sharing arrangement to limit each member's access to data in relation to that member's own data contributions, avoiding the inequality of a full reciprocity system. In a full reciprocity system, exchange member 112 may obtain access to over ten and a half million data files contributed by the other exchange members while only contributing two thousand files, which exchange member 106 may find inequitable. However, in the reciprocal data sharing system, exchange member 112 may be limited to accessing several thousand data files, rather than over ten million. Exchange member 106 may be more likely to join a data consortium employing reciprocal data sharing when such limitations are enforced.

The reciprocal data sharing model demonstrates a number of improvements over the full reciprocity model. For example, data exchange members may receive more equitable and balanced data access based at least in part on their own data contributions to the exchange. Data owners may retain greater control over their contributed assets, by having the ability to limit the quantities and types of data accessible to other members. Selectable sharing limits and options provide exchange members a more robust and flexible data exchange in which owners retain more control over their data. The total amount of data shared in response to a request may be better regulated due to data access limits, which may reduce infrastructure and network costs for the DMS 102, and may improve transmission response rates for exchange members. Further, the reciprocal sharing arrangement limits the amount of data sharing in a manner that incentivizes the exchange members to contribute data to the exchange.

As described herein, the DMS 102 may include a number of constituent elements, such as databases, memories, processing circuits, operating modules, interfaces and other elements. An example implementation of a DMS is described below with respect to FIG. 2.

Figure 2:
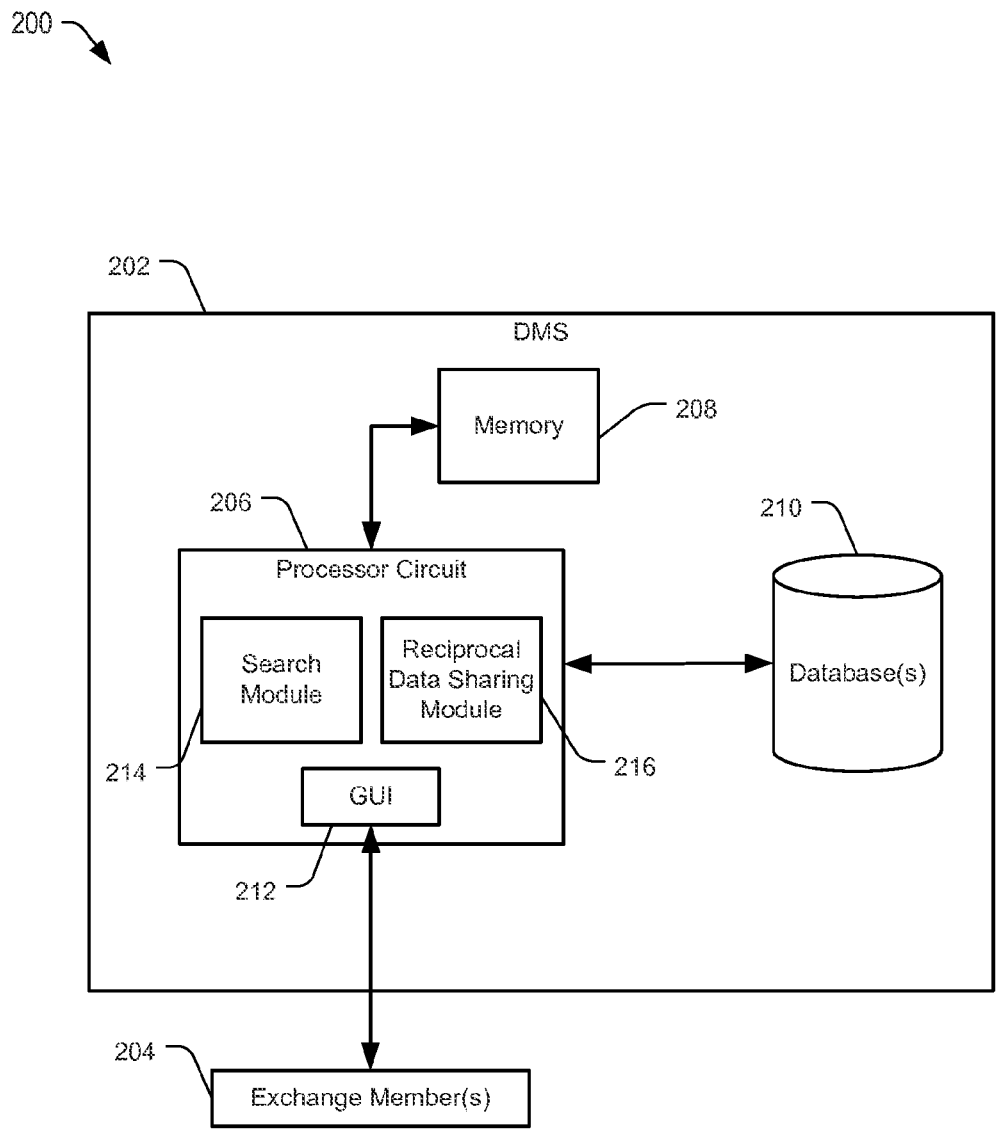
FIG. 2 is a block diagram of a system configured to provide reciprocal data sharing, in accordance with certain embodiments of the present disclosure.

FIG. 2 is a block diagram of a system 200 including a data management system (DMS) 202 implementing reciprocal data sharing, in accordance with certain embodiments of the present disclosure. The DMS 202 may correspond to the DMS 102 of FIG. 1. One or more exchange members 204, which may correspond to exchange members 106, 108, 110, and 112 of FIG. 1, may exchange data with the DMS 202.

The DMS 202 may include a processor circuit 206, a memory 208, and a database 210. The database 210 may include one or more databases and associated data storage devices, and may correspond to database 104 of FIG. 1. The database 210 may store the aggregated data of a data exchange consortium, such as consumer data, scientific data, other data elements, or any combination thereof. The database 210 may also store metadata associated with members of the data exchange, such as what data the member has contributed, what data is associated with or owned by which member, and what limits the member has placed on sharing of its data. In some embodiments, settings for the exchange members may be stored in a separate database from the contributed data.

The memory 208 may include one or more volatile or nonvolatile data storage devices, such as ROMs, hard disc drives, NAND flash memory, other memory devices, or any combination thereof. The memory 208 may provide a temporary storage location for use by the processor circuit 206 in performing data access, data processing, and data modification operations. In some embodiments, the memory 208 may store computer program code or instructions that, when executed, cause the processor circuit 206 to perform the operations of the DMS 202.

The processor circuit 206 may include one or more central processing units (CPUs), field programmable gate arrays (FPGAs), application-specific integrated circuits (ASICs), other circuits, chips, processors, or any combination thereof. The processor circuit 206 may include hardware modules, software modules, or a combination thereof, for performing the operations of the DMS 202. The processor circuit 206 may perform logical operations and execute data access, data modification or manipulation, and data storage operations of the DMS 202. In some embodiments, the processor circuit 206 may generate the GUI 212 for providing data to and receiving data and requests from exchange members 204. The processor circuit 206 may also include a search module 214 and a reciprocal data sharing module 216.

The GUI 212 may be generated by processor circuit 206. The GUI 212 may be a graphical interface which may be used by exchange members 204, or users or representatives thereof, to access the DMS 202. For example, the GUI 212 may include one or more user-selectable elements with which a user may interact to initiate a search or to initiate a data retrieval operation with respect to data stored in database 210. The GUI 212 may also include user-selectable elements that, when accessed by a user, may cause the GUI 212 to submit data to contribute data elements to the database 210, configure preferences of the exchange member 204, configure access operations, update one or more preferences, perform other operations, or any combination thereof. The GUI 212 may be presented in the form of a website, a computer application interface, or other interface that may be presented to a display of a computing device and by which a user or application may send data to or receive data from the DMS 102.

While the GUI 212 may be generated by the processor circuit 206, other embodiments are also possible. The GUI 212 may be presented as a set of instructions, as an executable program, or other script that may be executed by a processor internal to the DMS 202 or external to the DMS 202, such as at a processor of a computer of the exchange member 204 that communicates with the DMS 202. The GUI 212 may communicate information received from exchange member 204 to the processor circuit 206, and may present information from the DMS 202 to the exchange member 204.

The search module 214 may process data access requests received from exchange members 204 via the GUI 212. For example, the search module 214 may parse search language input by a user, and may search records of the database 210 to determine potential search results. The potential search results may be modified before presentation to the exchange member 204, for example, based on the reciprocal data sharing module 216 implemented by the DMS 202. In some embodiments, the actual requested data may be retrieved from the database 210 and added to the potential data list, wherein some of the requested data may be excluded from the final returned results. In some embodiments, the DMS 202 may retrieve metadata identifying the potential data based on the request, determine how much data may be provided to the requester based on reciprocal data sharing permissions, and may retrieve the permissible data based on the determination. Other embodiments are also possible.

The reciprocal data sharing module 216 may limit search results based on the data contributions of the requesting exchange member. For example, the reciprocal data sharing module 216 may access information (e.g. metadata files) regarding data contributions, data access history, or exchange member settings stored to database 210 or memory 208. The reciprocal data sharing module 216 may limit the amount of data accessible by an exchange member to some ration, fraction, or other numerical result based at least in part on the amount of data contributed by the exchange member. The reciprocal data sharing module 216 may also determine whether the exchange member has made corresponding types of its own data available to other members as a requisite to providing such data to the exchange member. In some embodiments, data available to an exchange member may also depend on settings selected by data owners of the requested data (i.e., the exchange members who provided the data that are part of the search results).

The reciprocal data sharing module 216 may select data based on settings configured by data owners. The reciprocal data sharing module 216 may determine the selected data based pm metadata representing sharing settings for the data owners. In some embodiments, a particular exchange member N may designate that any given exchange member may only access up to two times the amount of data from member N as the given exchange member has contributed. So if exchange member A has contributed 10 k data files, exchange member A may access up to 20 k data files from exchange member N. The reciprocal data sharing module 216 may determine the data access limits set by the data owner, the data contributions of the requesting exchange member, and a number of data files from the data owner that have already been accessed by the requesting exchange member. If additional data is requested by the requesting exchange member and the additional data has not exceeded the limits set by the data owner member, the reciprocal data sharing module 216 may provide the additional data from the data owner. In an example where a requesting member submits a data search with potential results from N contributing members, the reciprocal data sharing module 216 may apply the following representative equation to determine a total amount of data that may be accessed by the requesting member:

$$\text{Total accessible data} = \sum_{i=1}^{N}(\text{amount contributed} \ast \text{ratio}_i) \tag{1}$$

In the example of Equation 1, "amount contributed" may refer to an amount of data contributed by the requesting member, and "ratio" may refer to a sharing ratio selected by a data owner of a potential data element result. Further, the variable (i) refers to a selected exchange member from a plurality of exchange members, and the variable (N) refers to the number of exchange members (data owners) identified in the set of search results. Other embodiments are also possible.

The reciprocal data sharing module 216 may also determine data sharing limits based on value ratings associated with the requested data, other information, or any combination thereof. For example, different types of data elements may have different associated "value" ratings. Each datum contributed by exchange members may be measured for a total value of the contributed data, and that value may be used to determine a cumulative value of data to which the contributing member may have access. Other embodiments are also possible.

The reciprocal data sharing module 216 may be configured to handle reciprocal data sharing in a variety of implementations. There may be direct proportional measurement between an amount of data contributed by a member and the amount of data to which the member is permitted access (e.g. 1-to-1, 1-to-2, etc.). The proportion may be represented as a percentage (e.g. 200%), as a fraction (e.g. ½), via other mathematical computations, or by any combination thereof. The reciprocal data sharing proportion may vary based on industry (e.g. members may be permitted to access fewer files from other members in the same industry, or more files from other members in different industries). The reciprocal data sharing proportion may vary based on the context of the request (e.g. an intended use of the data, such as for marketing or for performing a credit check).

In some embodiments, the reciprocal data sharing module 216 may apply reciprocal data sharing limits when one or both of the data requester and the data owner configured its/their data sharing permissions to enable the reciprocity determination. In such an embodiment, the reciprocal data sharing module 216 may determine whether the requesting member has enabled reciprocal sharing rights with the data owner member, for example regarding sharing any data or sharing the same type of data requested by the requesting member. The proportions and settings may be selected to apply uniformly across the entire data exchange, may be selected to apply uniformly to subsets of members or industries, or may be implemented to allow each member to configure its settings.

In an example embodiment, a requesting exchange member 204 may access the GUI 212 to select a data search operation, including entering search criteria and a context of the search or intended use of the data. The requesting exchange member 204 may interact with the GUI 212 to submit data related to the search criteria and the context. The search module 214 may receive data related to the search inputs from the GUI 212, and may determine potential search results from the database 210 based on the data. The potential search results may include metadata associated with files (or records) that match the search criteria, including an identifier associated with an owner member of each file (or record). The owner member or data owner is the exchange member that originally contributed the data for storage in the database 210. The potential search results may be provided to the reciprocal data sharing module 216.

The reciprocal data sharing module 216 may access metadata for the requesting member 204 to determine an amount of data that the requesting member 204 has provided to the exchange, as well as the sharing settings selected by that member 204. The reciprocal data sharing module 216 may access metadata for the owner members of the data of the potential search results. By comparing the context of the search, the search member's metadata, and the owner's metadata, the reciprocal sharing module 216 can determine search results from the potential search results that requesting member 204 is permitted to access. The reciprocal data sharing module 216 may provide the search results to the requesting exchange member 204 via the GUI 212, via a file, or through other means (e.g. electronically or in physical form, such as a print out). If any of the potential search results were excluded from the final search results, the DMS 202 may notify the requesting member 204 (via email, text message, or other electronic notification) regarding the amount, the type, the owner, or other aspects of data excluded, and the reasons for the exclusion. It should be appreciated that the above-described example is just one example embodiment, and that different configurations and implementations may also be used.

In order to apply the appropriate proportional sharing arrangements, the reciprocal data sharing module 216 may access and compare metadata associated with the exchange members 204 involved in a data access operation (e.g. as a requesting member or as data owner members), metadata associated with files that comprise the potential data access results, or both. Examples of the metadata and the applications thereof are discussed below with respect to FIG. 3.

Figure 3:
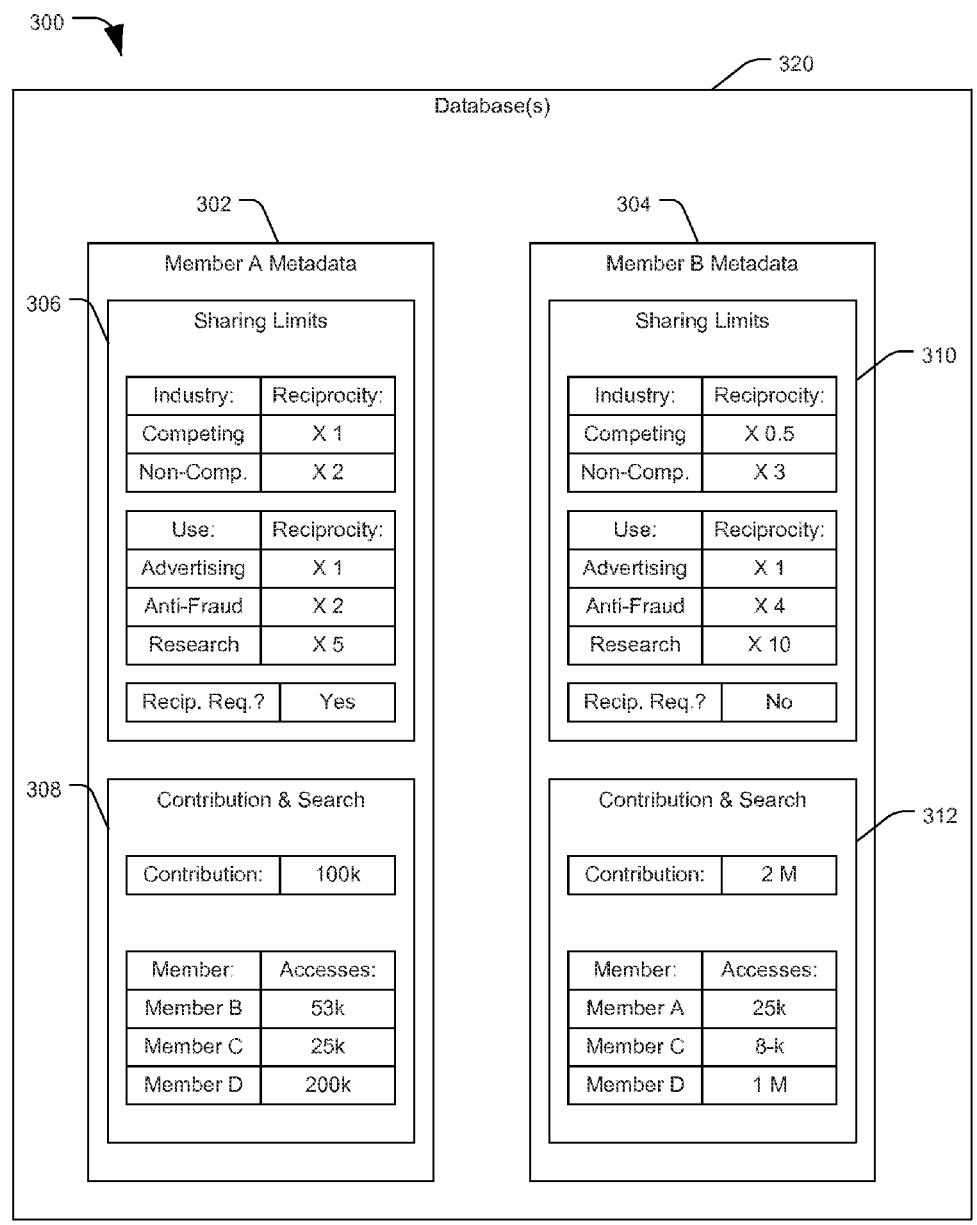
FIG. 3 is a block diagram of a system configured to provide reciprocal data sharing, in accordance with certain embodiments of the present disclosure.

FIG. 3 is a block diagram of a system 300 for reciprocal data sharing, in accordance with certain embodiments of the present disclosure. System 300 depicts a database 320, which may include one or more databases and which may correspond to database 104 of FIG. 1 or database 210 of FIG. 2. The one or more databases 320 may include data from a plurality of exchange members as well as their metadata. In the illustrated example, the one or more databases 320 include two example sets of metadata for two members of a data exchange: member A metadata 302 and member B metadata 304. Member A metadata 302 may include metadata about sharing limits 306, as well as member A contribution and search data 308. Similarly, member B metadata 304 may include metadata regarding sharing limits 310, as well as member B contribution and search data 312. Metadata 302 and 304 may be stored and updated by a data management system (DMS), such as DMS 102 of FIG. 1 and DMS 202 of FIG. 2.

The member A sharing limits metadata 306 may define limits (e.g., multipliers, ratios, etc.) with respect to how much of the data owned by member A may be accessed by another member. In some embodiments, each exchange member may configure its own sharing limits, for example, by using the GUI 212 of FIG. 2 to enter information to update metadata for that member stored, for example, at the DMS 102. In some examples, the types of sharing limit categories and values that may be selected by a member may depend on other factors, such as the type of membership for that member.

In some embodiments, the system 300 may provide membership tiers for different types of entities, allowing for research-based data sharing for educational institutions, for example, at a lower rate than industry members. For example, a data exchange may provide multiple member tiers or categories, where "premium" members may have greater flexibility in setting sharing limits, or may have access to more sharing limit categories for increased sharing specificity in relation to non-premium members. In some embodiments, sharing limits may be set by an administrator of the DMS 102 and may be the same for all members of a data exchange system. In some embodiments, the DMS 102 may auto-update share settings and limits based on software updates, scheduled setting updates, server load, other factors, or any combination thereof. For example, in some embodiments, a DMS 102 that has standardized sharing settings (such as a global sharing ratio applied to limit all data requests) may be simpler to implement or may operate faster than a system permitting individually-selected member settings. However, in some embodiments, it may be desirable for the DMS 102 to allow each data owner to configure its own reciprocity ratio independent of other members.

According to some embodiments, the member A sharing limits metadata 306 may include an "industry" category, and an associated reciprocity value for each industry option. In some embodiments, the industry category may be determined from the North American Industry Classification System (NAICS) codes used by Federal statistical agencies for classifying business establishments. The reciprocity value may designate a multiplier, percentage, ratio, or other value specifying how much of member A's data may be obtained in relation to the amount of data contributed by the requesting member. For example, if the requesting member has contributed 10 k data files, and the reciprocity value is 2×, the searching member may access (10 k×2)=20 k data files from member A, i.e., twice as many files as the member contributed.

In the depicted example, the industry options are "competing" and "non-competing." "Competing" may apply to members in the same industry as member A, and are therefore competitors to member A. For example, if member A is in the automobile sales industry, "competing" may apply to other members in the same industry, while "non-competing" may apply to members in other industries. Member A may wish to set a lower reciprocity value for competing members than for non-competing members, in order to maintain a competitive advantage. As shown in the sharing limits metadata for member A 306, the competing reciprocity value is set to ×1, while the non-competing reciprocity value is set to ×2. Similarly for the member B sharing limits metadata 310, the competing reciprocity value is set to ×0.5, while the non-competing reciprocity value is set to ×3. While industry settings of "competing" and "non-competing" are shown in FIG. 3, other embodiments are also possible. For example, there may be selectable categories for industries of members involved in the data exchange consortium, and members may select a specific reciprocity value for one or more of the listed industries. Further, while the reciprocity value is depicted as "×1" and "×2", it should be appreciated that the adjustable value may be in a variety of formats, such as ratios, decimals, or other forms.

Another possible category of sharing limits may be a "use" field or category, and associated reciprocity values. "Use" may refer to the specific application or context for which a data request is made. When sending a data search or request to the DMS 102, a member may specify the use for which the data is sought. For example, as shown in FIG. 3, the use categories may include, but are not limited to, "advertising," "anti-fraud," and "research." Advertising may include using the requested data, such as customer names and addresses, to send out advertisements and solicitations. Anti-fraud may include using the data to determine whether a potential customer is attempting to commit fraud by providing false information. Research may include using the data for statistical analysis or studies, such as determining broad market trends for publication in a scholarly journal. Other use categories are also possible.

The DMS 102 may determine a total reciprocity amount based on the reciprocity values associated with the "industry" and "use" categories, or based on any other reciprocity values or categories which may be set by members. For example, for a given data request (e.g. Competing industry, anti-fraud use), the corresponding "industry" reciprocity value may be multiplied by the corresponding "use" reciprocity value to determine the total reciprocity amount of data files a requesting member may access from the data owner member. In other instances, the highest or the lowest value between the "industry" and "use" reciprocity values may be used. For an example using the member A sharing limits metadata 306, if the industry was "competing" with a ×1 multiplier, and the use was research with a ×5 multiplier, a configuration to use the highest value would apply the research ×5 multiplier, while a configuration to use the lowest value would apply the competing ×1 multiplier. Other embodiments are also possible. Example reciprocity calculations are described in greater detail further below, with respect to FIGS. 4A and 4B.

In some embodiments, the reciprocity values which can be selected by members may have defined minimums, maximums, or both. For example, a reciprocity value of ×0.5 may be the lowest that a member can select, while no maximum limit may be set. In some embodiments, there may be a minimum reciprocity total across all fields in a category (e.g. "industry" or "use" categories). For example, the total minimum for a category may be a ×10 reciprocity setting, such that the selected reciprocity values for each entry in a category must add up to at least the minimum value of ×10. In such embodiments, a member may be permitted to set a ×0 reciprocity value for competing industries, but must have a minimum of ×10 available to other industries. Alternately, a member could set a ×2 reciprocity value for competing industries, and a ×8 reciprocity value for non-competing industries. Other alternatives are also possible.

As with the industry category, depending on the implementation the "use" category may or may not have minimum or maximum reciprocity settings. For example, members may be permitted to select ×0 for advertising if they do not want their customer data used for generating harassing advertisements. This, in turn, can lead to the next potential category of sharing limits as depicted in FIG. 3: the "reciprocity required?" field. If the reciprocity required field is set to "yes", the DMS system can determine whether the member requesting the data has made their own data available to corresponding data requests. For example, assume member Y has set their "competing" industry field or "advertising" fields to ×0 reciprocity, and then makes an "advertising" data query to competing industry member X. If member X has selected "yes" to reciprocity required, then no data would be returned to member Y, because member Y would not provide that data to member X were the positions reversed. However, if member X has selected "no" to reciprocity required, the requested data may be provided to member Y regardless of member Y's sharing settings. Other embodiments are also possible.

For example, rather than setting the reciprocity values to 0, members may be able to select sharing preferences, such that certain files, or a certain sub-part of a file (e.g. client social security numbers) are not available for sharing, or not available for sharing with certain members or industries, or for certain uses. The reciprocity required setting may check whether the data being requested from member Y by member X would be available to member Y in a matching request to member X. For example, if member Y requests data for "advertising" use, member Y must have its own data set as available for "advertising" use.

Member metadata may also include "contribution and search" metadata, such as metadata 308 for member A and metadata 312 for member B. Contribution and search data may reflect the data submitted and obtained by that member. For example, member A contribution and search metadata 308 indicates that member A has contributed one hundred thousand (100 k) data files to the data consortium. In various embodiments, the contribution value may be based on a total data contribution, a contribution over a time period (e.g. per month), based on other metrics, or some combination thereof.

In some embodiments based on total contribution, if member A joined the data exchange and provided 80 k files, the amount of data available to member A at that point would be based on the 80 k submitted. For example, member A may access the maximum allowed for member B of 160 k files (e.g. at a 2× reciprocity rate). If member A were to then submit another 20 k files, the total contribution would be updated to 100 k. Member A would then be permitted to access another 40 k files (at 2× reciprocity) from member B, for a total of 200 k files.

In another example based on a monthly contribution, if member A provided 5 k new files in March, its contribution value in April may be set to 5 k. Accordingly, member A may access files from other members during April based on its 5 k contribution value. The amount of files member A can access in each month may therefore depend on its data contributions from the previous month. In some embodiments, contributions may be prorated, or unused data accesses may be carried forward into subsequent months. Other embodiments are also possible.

Another example embodiment may involve a combination of total contribution and time-based tracking metrics. For example, the data contribution field may track all data that member A has provided since joining the consortium. Since member A may retain ownership of the data and may remove it from the data exchange, member A is effectively "resubmitting" all of their data each month. Accordingly, member A may be able to access an amount of data from other members each month based on member A's total data contribution. Other embodiments are also possible.

Incentives to data contribution may be offered through reciprocal data sharing. For example, an incentive may be offered that for every data element contributed in the month of August, the contributing member will be permitted to access double the normal amount of data files from the data exchange (e.g. a contribution of 2 k files may be treated as a contribution of 4 k files). In another embodiment, a higher reciprocity rate may be offered for selected types of categories of data elements (e.g. customer information on customers with a credit rating of over 800). Other embodiments are also possible.

In addition to the contribution data, member A's contribution and search metadata 308 may include values for the amount of data that member A has accessed from other members of the data exchange. The value for each type of data may be pre-determined. In the depicted example, member A has accessed 53 k files from member B, 25 k files from member C, and 200 k files from member D. In the illustrated example, the access ratio may be "per member" such that member A may access up to 200 k data records from each other member. In other embodiments, the access may be cumulative up to the reciprocal amount (e.g. 200 k).

When member A performs additional data searches or requests, the DMS 102 (e.g. using reciprocal data sharing module 216 of FIG. 2) may compare member A's data contributions and previous data accesses against the sharing limits set by owners of potential data results (e.g. by accessing the contribution and search metadata 306 for member A and the sharing limits metadata 310 of member B). If member A's previous data accesses to a data owner member do not exceed the data owner's sharing limits, based on member A's data contributions, member A may be permitted to access additional data. However, if member A has already accessed the maximum amount of data allowed by the data owner, no additional data may be provided to member A from that member. Examples of data access requests and reciprocal data sharing determinations are shown in FIGS. 4A and 4B.

Figure 4A:
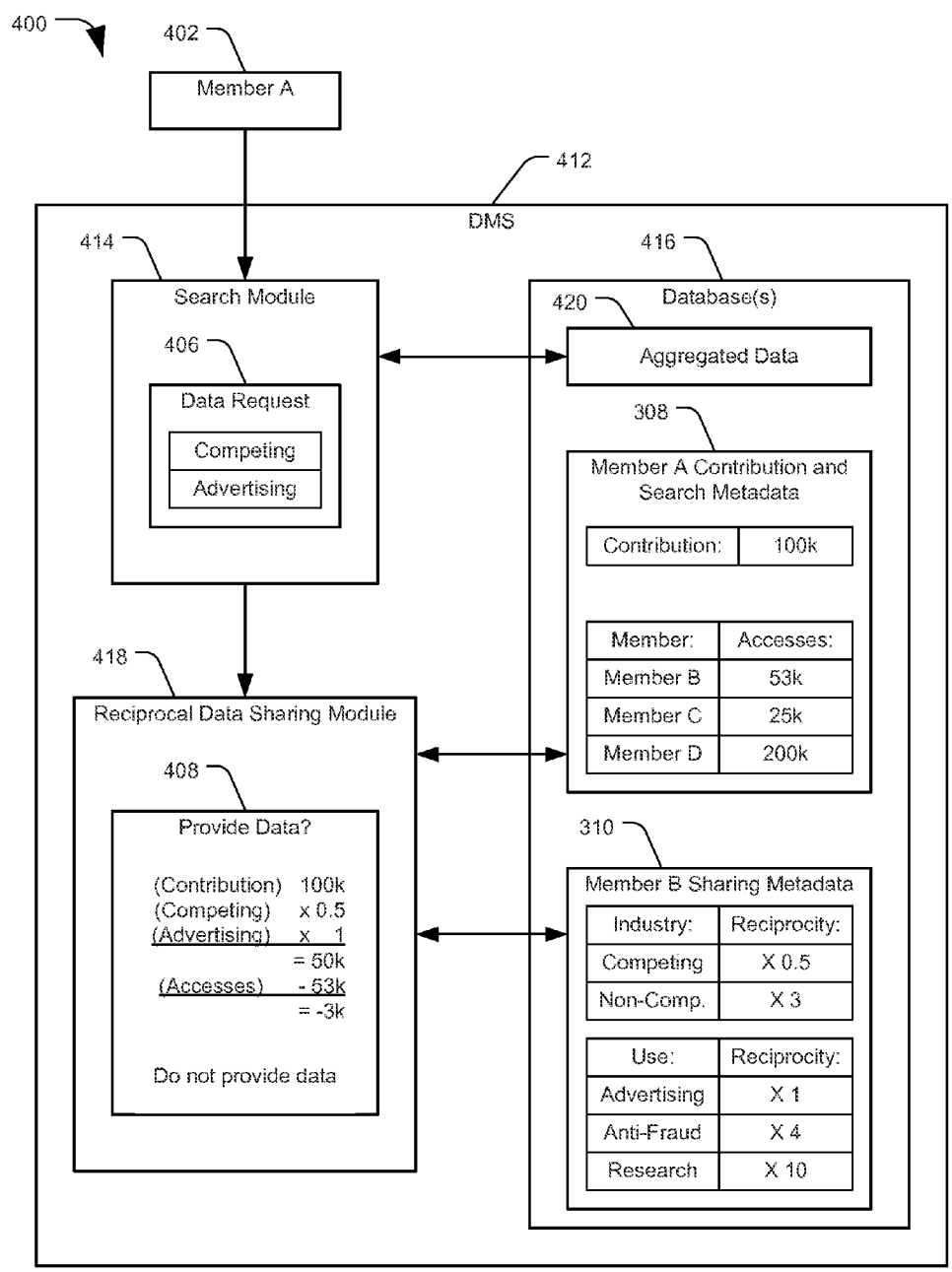
FIGS. 4A and 4B are block diagrams of systems configured to provide reciprocal data sharing, in accordance with certain embodiments of the present disclosure.
Figure 4B:
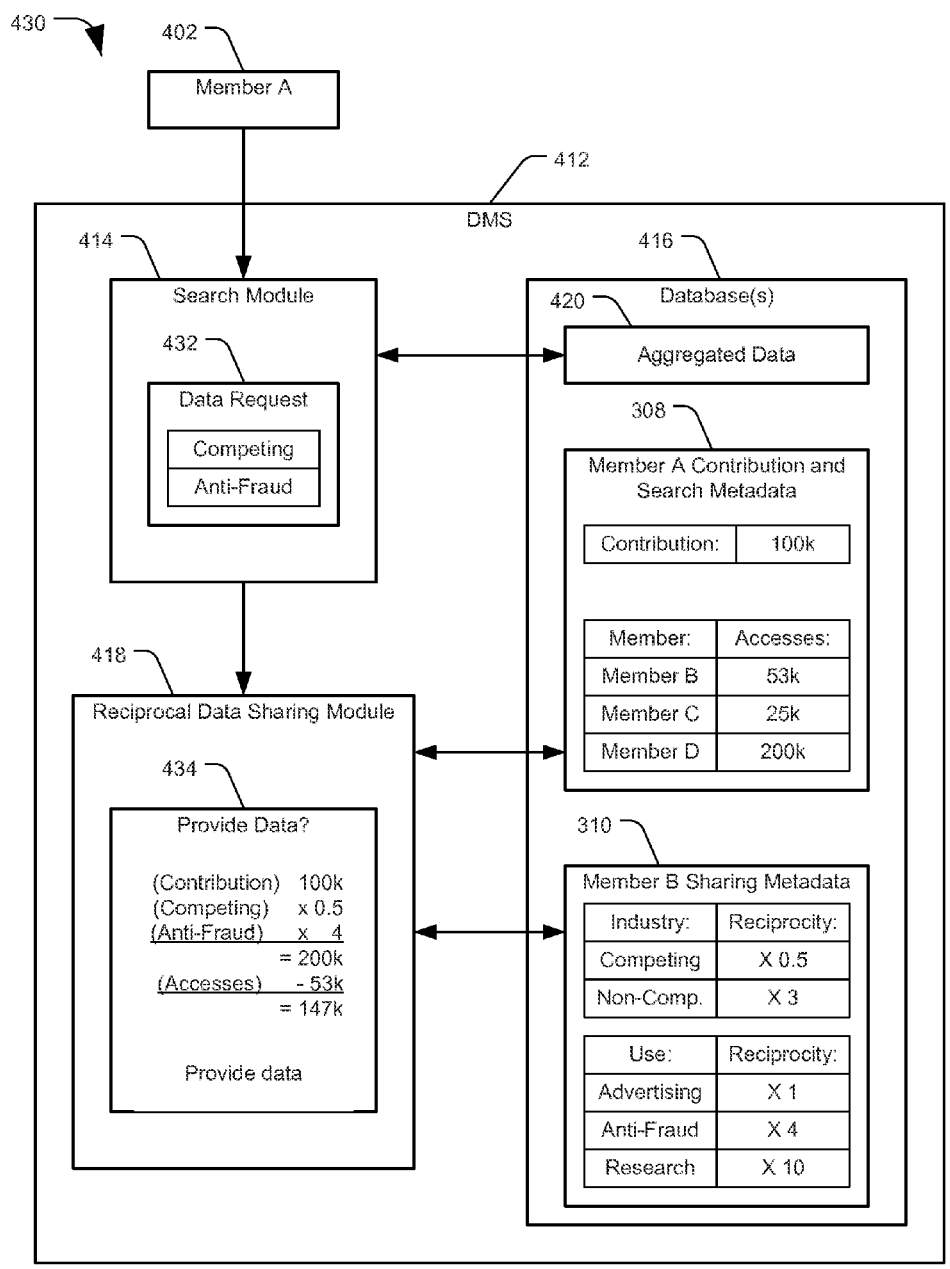

FIGS. 4A and 4B depict block diagrams of a system implementing reciprocal data sharing, in accordance with certain embodiments of the present disclosure. In particular, FIGS. 4A and 4B depict example data request transactions from member A that include potential data results owned by member B, and how the transactions may be handled by the DMS.

In system 400 of FIG. 4A, a DMS 412 includes a search module 414 (which may correspond to search module 214 of FIG. 2), a reciprocal data sharing module 418 (which may correspond to reciprocal data sharing module 216 of FIG. 2), and database 416. Database 416 may store aggregated data 420 contributed by members of a data exchange associated with DMS 412. Database 416 may also include metadata information, such as member A contribution and search data 308 from FIG. 3, and the member B sharing limits 310 metadata from FIG. 3.

Member A 402 may submit a data request 406 to DMS 412, which may be received at search module 414. The data request 406 may include an identifier for member A 402, and may include information such as an intended use for the data; in this example, "Advertising". Search module 414 may access database 416 to determine potential results from the aggregated data 420 based on the data request. The potential results may include metadata related to the potential results, such as the member that owns the data, the type of data, or other information. The potential results may include data owned by member B. Information regarding member A 402 and the potential results may be provided to reciprocal data sharing module 418.

In some embodiments, members may also be able to direct data requests to another specific member, or request a specific data entry (or record). In such embodiments, the data request 406 may also specifically identify a target member or target data. For example, a member may be able to use the GUI specify that the searching member only wants to search data from a particular target member, or may request data related to a particular customer by name or by social security number. Other embodiments are also possible.

In some embodiments, the search module 414 may also be configured to obtain some or all of the metadata that may be used by the reciprocal sharing module 418, such as member sharing limits or data contributions, and provide that metadata along with the potential data results in order to reduce or eliminate the need for different modules to access the database 416, or the need for repeated accesses to the database 416. In some embodiments, reciprocal data sharing module 418 may access database 416 to obtain additional metadata after receiving the potential results, and use the metadata to determine what data member A is entitled to access. For example, the reciprocal data sharing module 418 may determine the industry in which member A operates for use in determining the appropriate sharing limits from the data owner members. While determining whether member A 402 is entitled to access data from member B, reciprocal sharing module 418 may determine member A's contribution and search metadata 308 and member B's sharing metadata 310. The reciprocal sharing module 418 may also determine that the data request 406 was submitted by a "competing" industry member to member B. The reciprocal sharing module 418 may perform data calculations based on the obtained metadata, as indicated by block 408, to determine whether to provide the data and what proportion of the data to provide member A.

As shown in block 408, the reciprocal sharing module 418 may read member A's data contribution field to determine that member A has contributed 100 k data files. This contribution value may then be multiplied by 0.5, based on member B's reciprocity setting for "competing" industries, resulting in a value of 50 k. That value may then be multiplied by 1, based on member B's reciprocity setting for "advertising" uses. The resulting value, 50 k, may then be reduced by member A's previous data accesses to member B, 53 k. The resulting value is −3 k, which is less than the amount of requested data. Accordingly, the reciprocal sharing module 418 may determine that the requested data will not be provided to member A. Instead, member A may receive a notification that the requested data exceeds member A's permitted data accesses to member B. In some embodiments, the DMS 412 may offer to provide the data for a fee.

It should be apparent to those skilled in the art that the calculations described above can be performed in other ways. For example, the various reciprocity multipliers selected by member B and applicable to the request may be multiplied by each other, and then the result multiplied by member A's contribution, rather than multiplying the contribution by a first multiplier, then multiplying the result by a second multiplier. For the above example, the calculation could be performed as $((0.5*1)*(100 \text{ k}))-53 \text{ k}=-3 \text{ k}$. Other embodiments are also possible.

FIG. 4B depicts system 430, and provides an example of a different data access request from member A 402 that involves data from member B. System 430 may include many of the same elements as system 400 from FIG. 4A, including DMS 412 comprising a search module 414, a reciprocal data sharing module 418, and a database 416. The database 416 may still include aggregated data 420, member A contribution and search metadata 308, and member B sharing metadata 310.

On system 430, however, the data request 432 is different from FIG. 4A. Search module 414 may still determine potential results of the data request 432 that include data from member B, and member A 402 may still be in a competing industry to member B. Rather than specifying an "advertising" use as in FIG. 4A, however, member A 402 may specify an "anti-fraud" use for the data request 432. Accordingly, the calculations 434 performed by the reciprocal data sharing module 418 may be different as well.

The contribution value for member A 402 is still 100 k, and the reciprocity multipliers set by member B for competing industries is still 0.5, resulting in a 50 k value. Member B has a ×4 multiplier for anti-fraud data uses, which results in a value of 200 k. Member A's 402 previous 53 k data accesses to member B may be subtracted from this amount, resulting in a value of 147 k. This value is greater than the requested amount of data, and so the data may be provided to member A 402. The reciprocal sharing module 418, the search module 414, or another component of DMS 412 may then update member A's 402 "accesses" field of metadata 308 for member B according to the amount of data obtained.

In some embodiments, the evaluation as to whether to provide data may determine a number of remaining data elements that member A is entitled to, and provide only up to that many elements from member B. In some embodiments, the evaluation as to whether to provide data is repeated for every potential result determined by the search module 414, which may also correctly address data sharing when a member approaches their access limit. In some embodiments, potential results may be determined, organized according some ranking structure (e.g. most relevant results listed first), and then the data filtering may be applied. This may result in a data requester obtaining the most valuable or relevant results first, and having the least relevant results removed from the potential results by any exceeded sharing limits. Other embodiments are also possible.

In some embodiments, the reciprocal data sharing module 418 may determine what type of data that member B contributed to the database 416. When member B submits a request, the DMS 412 may determine the type of data that member B contributed and then may limit the search results from other members to the same type of data. In some embodiments, in addition to limiting the results to the same type of data, the DMS 412 may apply a numeric value to limit the amount of such data to a proportion or percentage of the amount contributed by member B.

Figure 5:
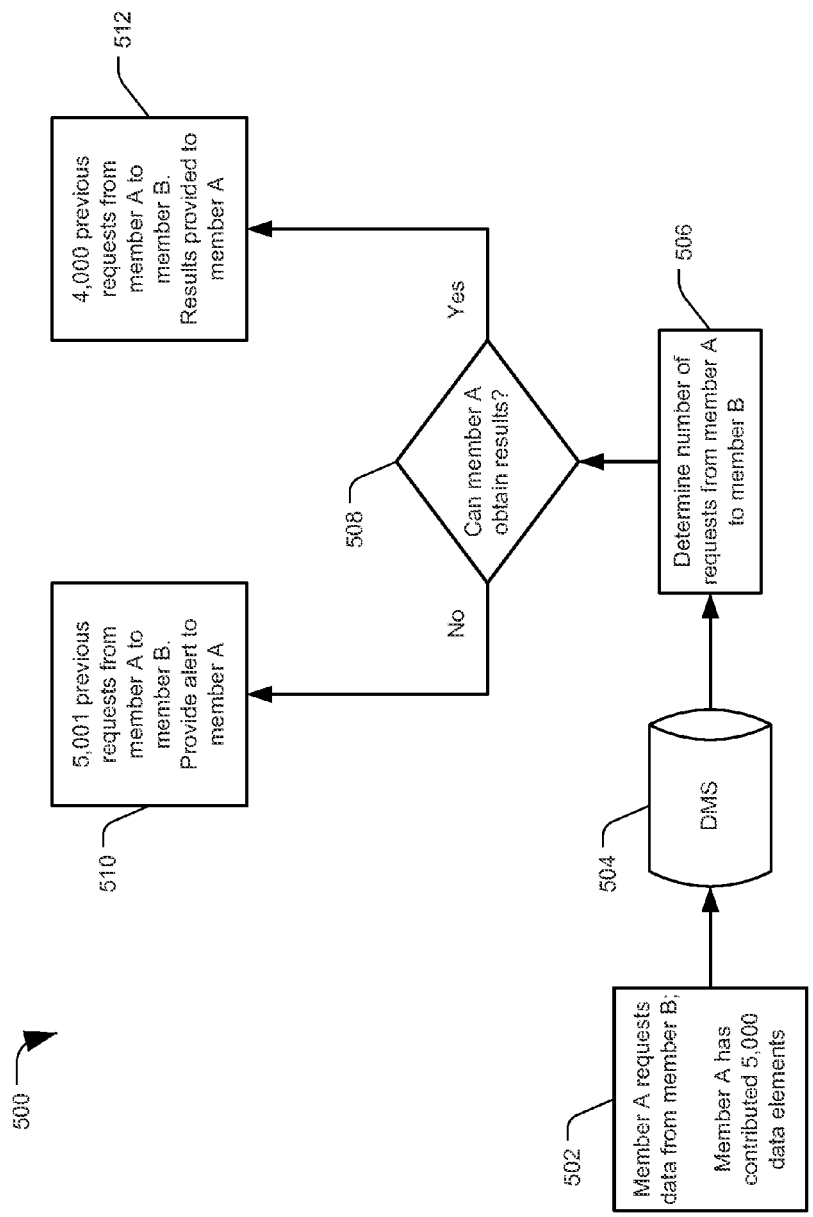
FIG. 5 is a flowchart of a method of providing reciprocal data sharing, in accordance with certain embodiments of the present disclosure.

FIG. 5 shows an example flowchart of a method 500 of implementing reciprocal data sharing, in accordance with certain embodiments of the present disclosure. At 502, member A requests data from member B, either directly or by sending a data request that includes data from member B as potential results. The request is received by the data management system (DMS) at 504. The DMS may determine information about member A based on the data request, such as by accessing metadata associated with member A to determine that member A has contributed 5,000 data elements to the data exchange and to determine the number of previous data requests from member A to member B, at 506. Based on the determination, the DMS may decide whether member A can obtain the requested data, at 508, for example by comparing member A's contributions and previous number of accesses against member B's sharing limits, as described in relation to FIGS. 4A and 4B. In the depicted method 500, it is assumed that the reciprocity threshold set by member B for the requested data is ×1, so that member A can access the same amount of data from member B as member A has contributed.

When member A's data requests have exceeded the threshold, such as by requesting over 5,000 data elements, the DMS may determine at 508 that member A cannot obtain the results. A response may be returned to member A including a notification or alert that requested data cannot be provided, at 510. In some embodiments, the system may generate an alert, which may be an internal signal to the DMS, to the GUI generator or to another module or component. When member A's data requests have not exceeded the threshold, the DMS may determine at 508 that member A can receive the data. The requested data may be provided to member A, at 512.

The amount of data submitted and requested by data exchange members, and tracked by the DMS for the purposes of reciprocity calculations, may include individual data elements, or may include combinations of multiple data elements (e.g. a data file or record may include data about a customer, which may include multiple data elements relating to individual aspects of the customer's file). In addition, rather than or in addition to the DMS tracking a number of files submitted, the DMS may track and base reciprocity on a value associated with various types of files. These concepts are explored in greater detail in the discussion of FIG. 6 below.

Figure 6:
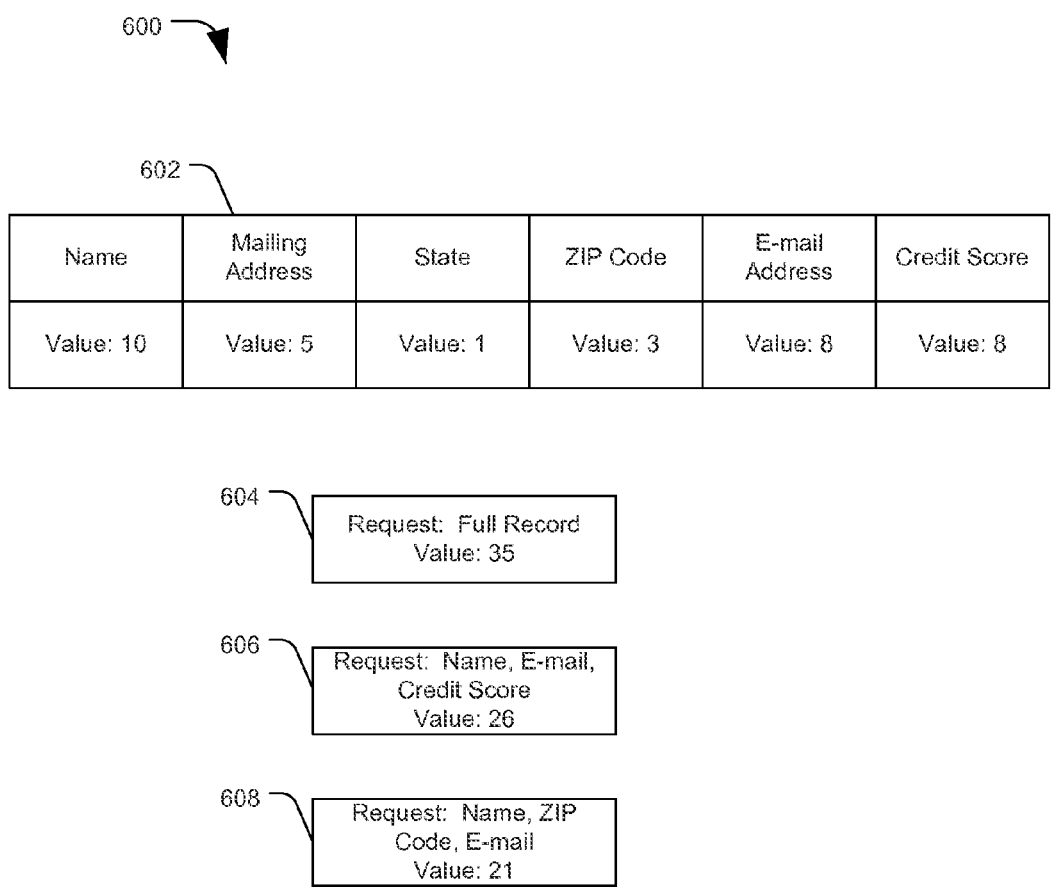
FIG. 6 is a block diagram of a system configured to provide reciprocal data sharing, in accordance with certain embodiments of the present disclosure.

FIG. 6 is a block diagram of a system 600 for reciprocal data sharing, in accordance with certain embodiments of the present disclosure. Instead of or in addition to counting a quantity of data contributed by each member, and a quantity of data obtained from other members, data reciprocity can be handled in other ways. For example, system 600 depicts an embodiment in which different data elements are attributed different "values." Accordingly, contributed data and requested data may be measured by total "value" rather than by a quantity metric.

System 600 may include a plurality of customer data records including customer data record 602, which may comprise multiple data elements or "fields," each having a value rating. For example, customer data record 602 may include a 'name' field, having a value of 10; a 'mailing address' field having a value of 5; a 'state' field representing a state of residence in the United States, having a data value of 1; a 'ZIP code' field for the customer's residence having a value of 3; an 'e-mail address' field having a value of 8; and a 'credit score' field having a value of 8. These are just examples, and other data elements may also be included, such as a transaction history, a customer's age, one or more interests, other data elements, or any combination thereof. Members of the data exchange may have data to contribute for some or all of these fields, and the DMS may assign a corresponding value to the contributed data. In some embodiments, the value of a particular piece of data may be determined by an operator and may be assigned to the field, independent of the contents of the field for any given record. By assigning values to the contributed data, the values can be used to determine the "worth" or each member's contribution with greater granularity merely counting a number of data contributions. Accordingly, data element valuation allows for greater accuracy in determining appropriate reciprocal sharing between members.

In some embodiments, the value rating for each data element or field may be standardized for all members of the data exchange consortium. In other embodiments, members may be permitted to set values of the elements for the data that member has contributed. Selectable values may be constrained to minimum or maximum limits set by the DMS. Other embodiments are also possible.

Members may choose to request only certain elements or fields, depending on the member's needs or interests. For example, sample request 604 for a full record, including all of the data elements of record 602, may have a combined value of 35. For each full record requested by a member, that member must be below 35 "points" of their data sharing limit from the target data-providing member. For sample request 606, the member may request less than the full record. For example, the member may request a name, e-mail address, and credit score for a total value of 26. In sample request 608, the requested elements may be name, ZIP code, and e-mail address, for a total value of 21. Other embodiments are also possible.

FIGS. 7 through 11 depict a number of example methods of implementing reciprocal data sharing. It should be understood that these are merely illustrative embodiments, and other methods and variations may be implemented without departing from the scope of this disclosure. Further, it should be appreciated that some blocks may be combined and, in some instances, the order of elements may be changed without departing from the scope of the present disclosure.

Figure 7:
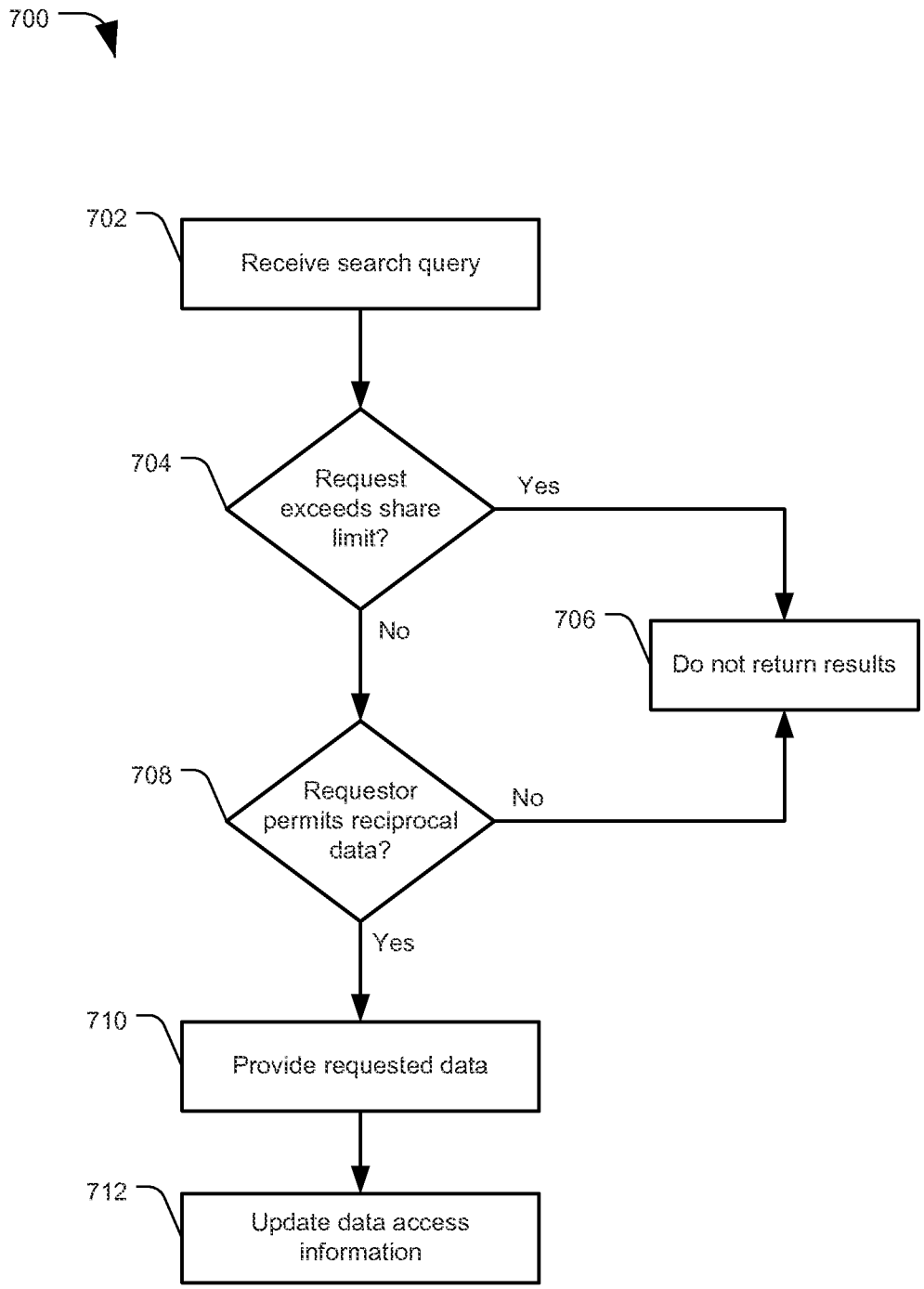
FIG. 7 is a flowchart of a method of providing reciprocal data sharing, in accordance with certain embodiments of the present disclosure.

Turning now to FIG. 7, an example flowchart of a method 700 of implementing reciprocal data sharing is shown, in accordance with certain embodiments of the present disclosure. Method 700 and other methods discussed herein may be implemented by a data management system (DMS), such as by using a processor circuit 206 of DMS 202 of FIG. 2. Method 700 may include receiving a search query, at 702. For example, a member of the data exchange may request data that meets certain specified search criteria.

Method 700 may include determining whether the received request exceeds the data sharing limit set by the member that provided the requested data, at 704. For example, this may include determining the amount of contributed data provided by the searching member, and comparing that amount against a reciprocal sharing limit. If the request does exceed the share limit, at 704, the method 700 may include sending a notification to the data requestor, at 706. In embodiments where method 700 is iteratively repeated for multiple data elements or data owners, a combined list or notification regarding exceeded share limits may be generated. In some embodiments, the method 700 may end at 706 without sending a notification to the requesting member.

If the request does not exceed the share limit, at 704, the method may include determining whether the requestor permits reciprocal data sharing, at 708. In some embodiments, this step may only be performed if the data owner has chosen to limit sharing unless reciprocal data is available from the requesting member, such as indicated in the sharing limits metadata 306 of FIG. 3. In some embodiments, reciprocal sharing may be mandatory in the DMS system, or may be mandatory for certain types of data. Other embodiments are also possible.

If the requesting member does not permit reciprocal data sharing on the requested data, the method may include providing a notification to the requestor, at 706. If the requesting member does permit reciprocal data sharing for the type of data requested, at 708, the requested data may be provided to the requesting member, at 710. The data access information for the requesting member may be updated to reflect the successful data access, at 712.

In some embodiments, the DMS may determine a list of potential results in response to receiving the search query at 702, and may determine the members that contributed each data element of the potential results, e.g., the data owners. The DMS may then perform the remaining steps of method 700 for each data element or for each data owner, for example based on share limits set by the data owners. In other embodiments, the search query may be to retrieve a particular data file or element, or to retrieve data from a particular contributing member. In such embodiments, the DMS may only need to perform the steps of method 700 for the single contributing member. Other embodiments are also possible.

In some embodiments, the method 700 may determine a type of data contributed by a member in response to receiving the query at 702. In such an embodiment, the method 700 whether data corresponding to the received request exceeds the data sharing limit set by the member that provided the requested data, at 704. In some embodiments, the method 700 may include searching the database based on the query and then filtering the results based on the data sharing settings.

Figure 8:
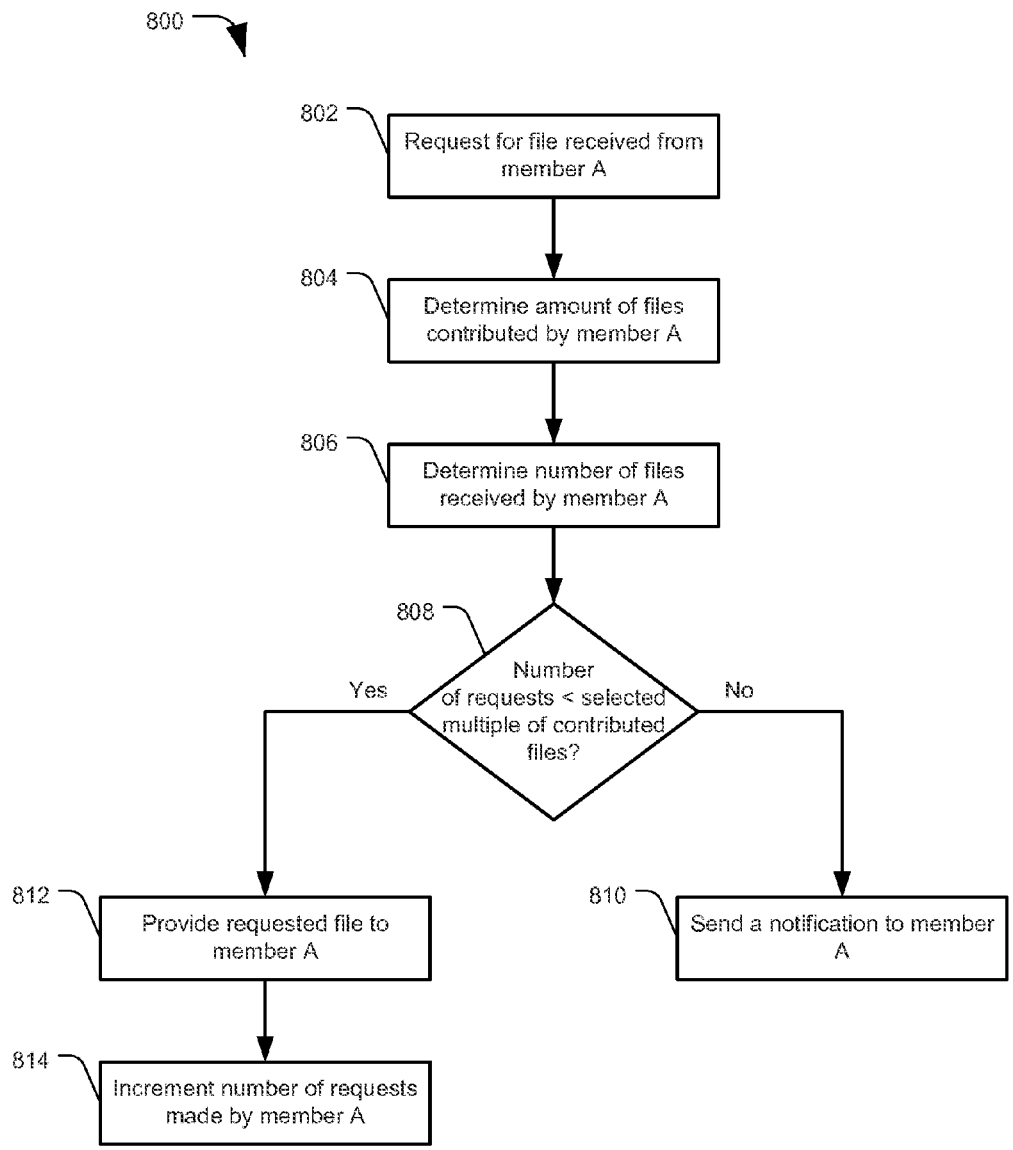
FIG. 8 is a flowchart of a method of providing reciprocal data sharing, in accordance with certain embodiments of the present disclosure.

Turning now to FIG. 8, an example flowchart of a method 800 of implementing reciprocal data sharing is shown, in accordance with certain embodiments of the present disclosure. Method 800 may include receiving a request for a file from member A, at 802. The method 800 may next include determining an amount of files contributed by member A, at 804. For example, this may be a total number of files member A has contributed to the data exchange, an amount contributed within a given time period, or some other measurement. In some embodiments, a "value" score of the contributed data may be determined, rather than an amount or number of files or data. Other embodiments are also possible.

At 806, the method may include determining a number of files previously received by member A. At 808, method 800 may include determining whether the number of requests determined at 806 is less than a selected multiple of the contributed files determined at 804. As an example, the selected multiple may be "×2" or 200% of the amount of files contributed by member A.

If the number of requests is not less than the selected multiple, at 808, member A may have exceeded the number of file requests allowed based on the member A's own file contribution. Accordingly, method 800 may include sending a notification to member A, at 810. If the number of prior received files is less than the selected multiple, at 808, the method may include providing the requested file to member A, at 812. The number of requests made by member A may then be incremented, at 814. For example, the DMS may update a metadata file associated with member A to reflect that an additional file request has been completed between member A and the member that provided the requested file. In an embodiment where data requests are not broken down based on the member that provided the data (e.g. reciprocal sharing amounts are for all aggregated data of the data consortium, rather than measured on a member-to-member basis), each member may have a single "number of requests" metadata value for all requests to the data exchange made by that member. Other embodiments are also possible.

In some embodiments of method 800, the selected multiple of contributed files using for data sharing may be based on sharing limits selected by the data owner. In some embodiments, the selected multiple may be standardized for all members of data exchange. For example, the DMS may use the same limits for all data requests or for all members. In another example, each member may have a pre-determined limit to access any data from the exchange, regardless of which member provided it (e.g., a member may access ten times the number of files that member has provided, without individual limits for each providing member). Other embodiments are also possible.

Figure 9:
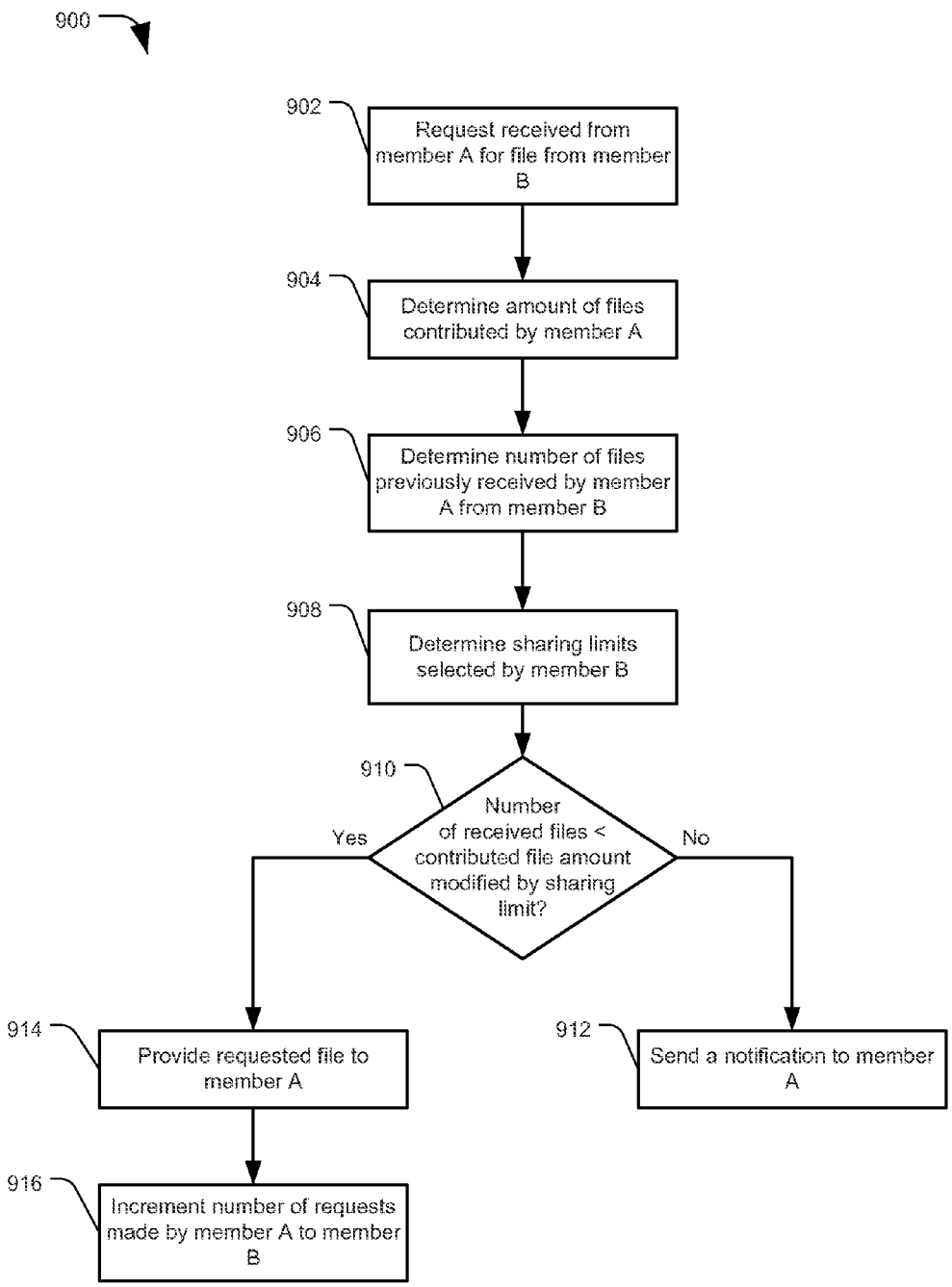
FIG. 9 is a flowchart of a method of providing reciprocal data sharing, in accordance with certain embodiments of the present disclosure.

FIG. 9 depicts an example flowchart of a method 900 of implementing reciprocal data sharing, in accordance with certain embodiments of the present disclosure. Method 900 may include receiving a request from member A for a file from member B, at 902, for example by a direct request for a specific data file owned by member B. The method 900 may include determining the amount of files contributed by member A, at 904, and determining the number of files previously received by member A from member B, at 906. In addition, method 900 may include determining the sharing limits selected by member B. These may include sharing limit multipliers to apply to a number of data contributions by requestors in different industries and for requests for different uses, as depicted in FIG. 3, other sharing limit factors, or any combination thereof.

At 910, the method may include determining if the number of received files from 906 is less than the amount of contributed files modified by the sharing limits from 908. For example, the DMS may access metadata files from one or more databases of the DMS detailing data access histories, data contributions, and sharing limits. The amount of contributed files modified by the sharing limits may be referred to as the "selected multiple" of the amount of contributed files. If the number of requests is not less than the selected multiple, the method may include sending a notification to member A that the requested data will not be provided, at 912. If the number of requests is less than the selected multiple, the method may include providing the requested file to member A at 914, and incrementing the number of requests made by member A to member B, at 916.

Figure 10:
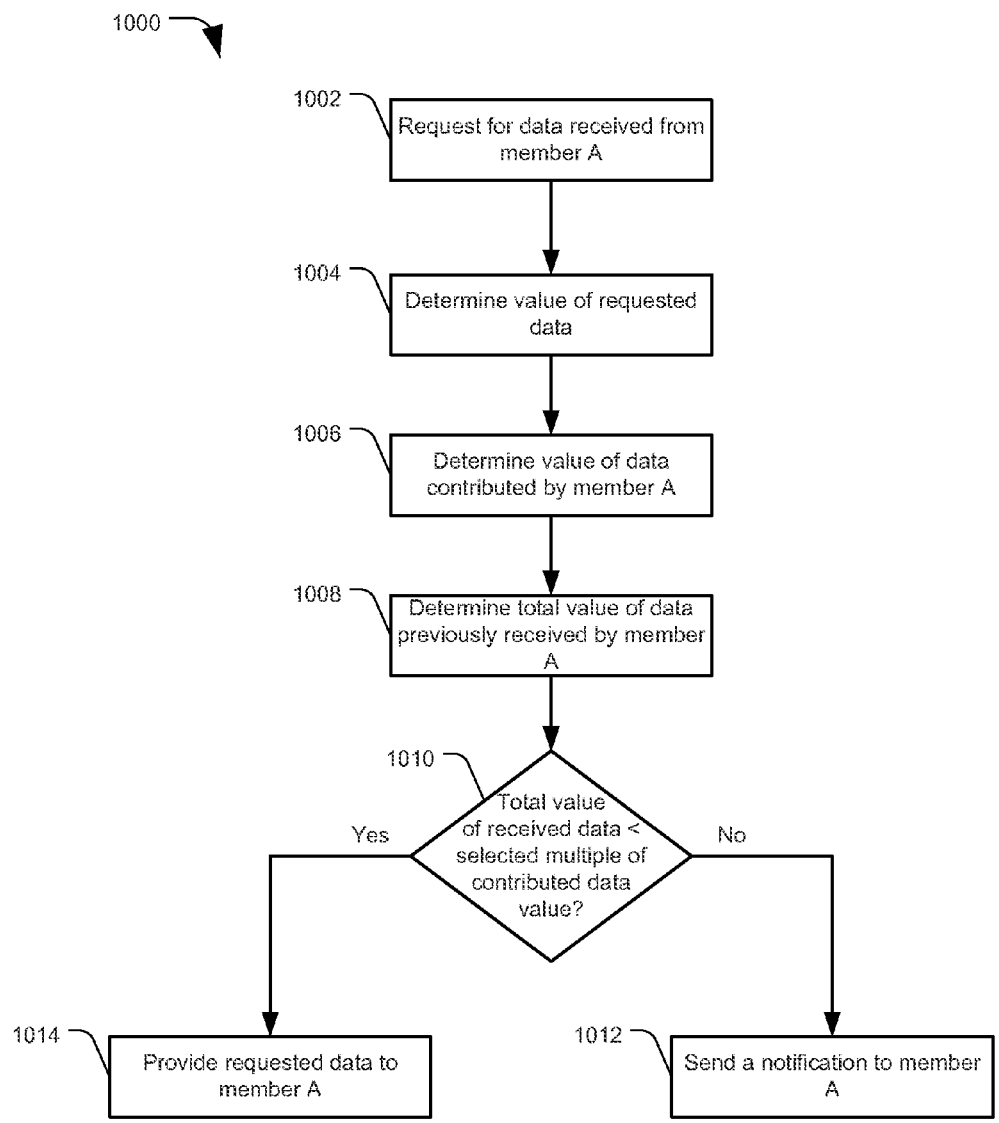
FIG. 10 is a flowchart of a method for shared data valuation, in accordance with certain embodiments of the present disclosure.

Turning now to FIG. 10, an example flowchart of a method 1000 of implementing reciprocal data sharing is shown, in accordance with certain embodiments of the present disclosure. Method 1000 may include receiving a request from member A for data, at 1002. In the depicted method, data contributions and requests may be measured based on an associated "value," score, or rating of the data, as shown in FIG. 6, rather than a quantity or amount of data. At 1004, the method may include determining the value of the requested data. Value may be determined based on the type of data and numeric values assigned to each type of data. Method 1000 may include determining the value of data contributed by member A to a data exchange, at 1006, and determining a total value of data previously received by member A, at 1008. The total value of the received data may be for data received from the entire data exchange, or for data received from a data owner that provided the currently-requested data.

At 1010, the method may include determining whether the total value of previously received data determined at 1008 is less than a selected multiple of the value of member A's contributed data, at 1010. As in certain previous examples, the selected multiple may be a global value for the entire data exchange, or it may be based on particular values selected by the data owner of the requested data. If the total value of the previously received data is not less than the selected multiple, at 1010, the method may include sending a notification to member A, at 1012. If the total value of the previously received data is less than the selected multiple, at 1010, the method may include providing the requested data to member A, at 1014.

Figure 11:
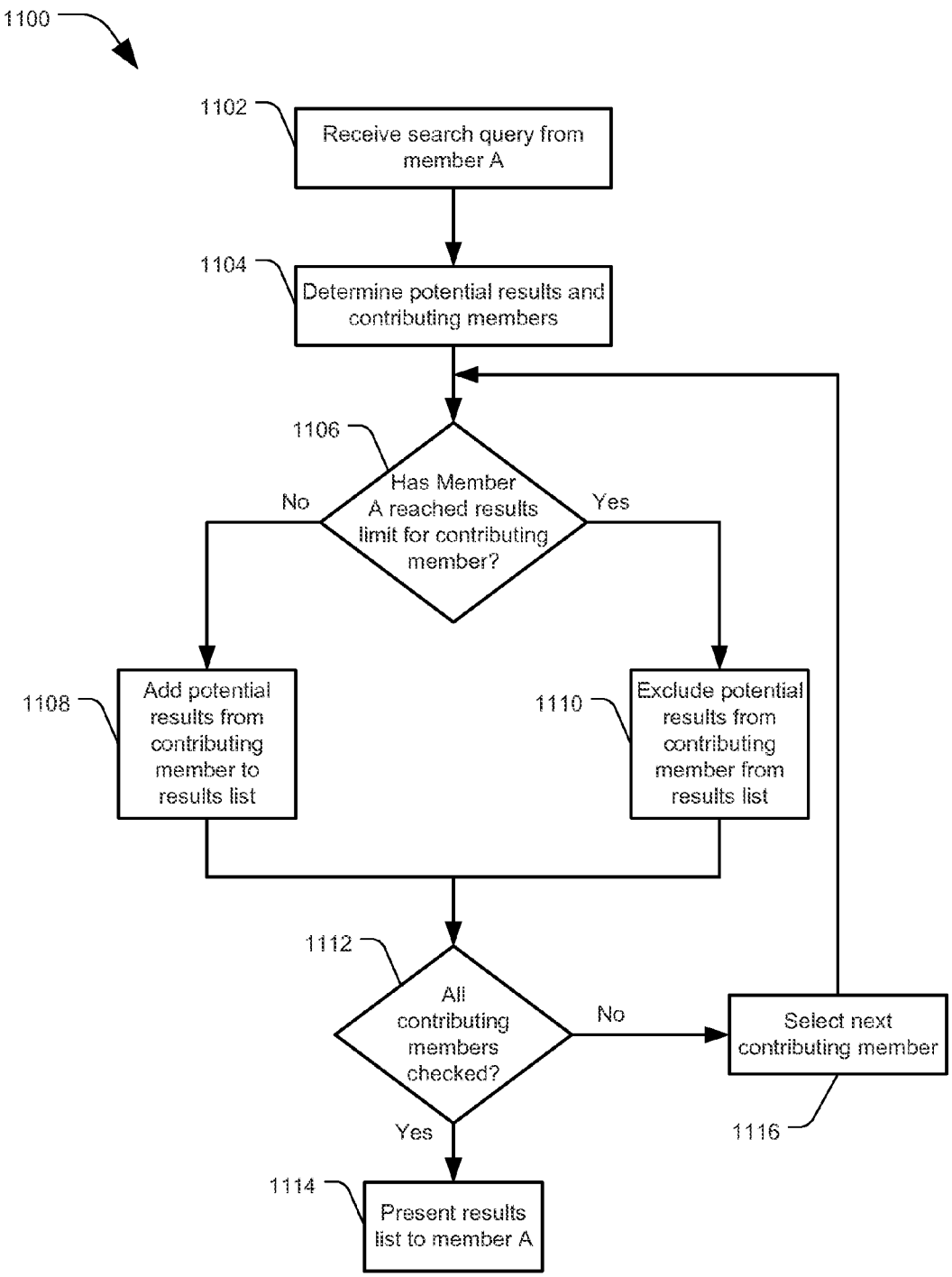
FIG. 11 is a flowchart of a method of providing reciprocal data sharing, in accordance with certain embodiments of the present disclosure.

FIG. 11 depicts an example flowchart of a method 1100 of implementing reciprocal data sharing, in accordance with certain embodiments of the present disclosure. Method 1100 may include receiving a search query from member A, at 1102. At 1104, potential results and corresponding contributing members may be determined.

Method 1100 may include determining whether member A has reached a results limit for the first contributing member, at 1106. For example, this may include comparing member A's data contributions and prior data requests to the contributing member against the contributing member's sharing limits. If member A has not reached the results limit for the contributing member, the potential results for the contributing member may be added to a results list, at 1108. If member A has reached a results limit for the contributing member, at 1106, the method may include not adding the potential results from the contributing member to the results list, at 1110.

Method 1100 may include determining whether all contributing members have been checked in regards to adding to the results list, at 1112. If not, the method 1100 may include selecting the next contributing member, at 1116, and repeating the method from 1106. Once all of the contributing members have been checked at 1112, the completed results list may be presented to member A, at 1114.

It should be appreciated that elements of the flow drawings of FIGS. 7-11 may be changed, combined, or their order changed without departing from the scope of the present disclosure. Further, in conjunction with the embodiments of the systems, methods, and apparatuses described above with respect to FIGS. 1-11, a reciprocal data sharing system is described that imposes limits on data provided to a requesting member in proportion to the amount of data contributed to the system by the requesting member. By applying reciprocal sharing limits, the system facilitates exchange of information in a manner that may be fair to large data contributors and with a methodology that encourages participation. Further, in some embodiments, the data owner may retain some control over its data even after the data is provided to the exchange system. In particular, the system may allow the data owner to configure one or more data sharing preferences, and even to assign proportional sharing values to various types of data. In some embodiments, the system may allow the data owner to apply different sharing limits to different types of data, to different types of requests, to different types of requesters, to other data, or any combination thereof.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments blocks may be removed or combined without departing from the scope of the disclosure. Further, structural and functional elements within the diagram may be combined, in certain embodiments, without departing from the scope of the disclosure. For example, certain modules and components may be combined, or split into sub-components. Functionality assigned to a particular component or module may be handled by another component instead. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
    a memory device to store instructions that, when executed, cause a processor to:
    receive a data request from a computing device associated with first member of a data exchange system via a network;
    determine a data contribution associated with the first member;
    determine a data access limit for the first member based in part on the data contribution;
    retrieve data including a plurality of records from a database based on the data request;
    determine a second member of the data exchange system that contributed a data element of the results data to the data exchange system;
    determine the data access limit further based on a data sharing limit selected by the second member, the data sharing limit includes a reciprocity value to apply to the data contribution based on an industry type of the first member and based on a use specified by the first member; and
    automatically apply the data access limit to the retrieved data to selectively provide send results data including a number of records of the plurality of records determined according to the data access limit through the network to the computing device of the first member in response to the data request; and
    automatically update the data access limit based on the results data sent to the computing device of the first member.

2. The system of claim 1, further comprising:
    the data contribution includes an amount of data the first member previously provided to the data exchange system;
    the data access limit includes an amount of data to which the first member is permitted access in exchange for the data contribution; and
    the memory device further storing instructions that, when executed, cause the processor to selectively provide the results data to the first member in response to the data request when the first member has not exceeded the data access limit.

3. The system of claim 1, further comprising:
    the data contribution includes a total value of data the first member provided to the data exchange system, wherein a plurality of data categories have a corresponding plurality of values; and
    the data access limit includes a value of data to which the first member is permitted access in exchange for the data contribution.

4. The system of claim 1, further comprising:
    the data access limit includes a number obtained by modifying the data contribution by the data sharing limit.

5. The system of claim 4, the memory device further instructions that, when executed, cause the processor to:
    determine whether the first member has exceeded the data access limit, including:
    determine a number of data accesses by the first member to data provided by the second member;
    determine whether the number of data accesses is less than the data access limit; and
    provide the results data in response to the data request when the first member has not exceeded the data access limit.

6. The system of claim 1, the memory device further instructions that, when executed, cause the processor to:
    determine that the first member permits sharing of reciprocal data to the second member prior to providing the results data in response to the data request.

7. The system of claim 1, the memory device further instructions that, when executed, cause the processor to:
    determine a list of selected potential data in response to the data request;
    determine one or more members of the data exchange that provided the selected potential data;
    determine the data access limit for the first member in relation to each of the one or more members;
    when the first member has not exceeded the data access limit for a given member of the one or more members, add the selected potential data from the given member to a results list; and
    return the results list to the first member as the results data.

8. A method comprising:
    receiving, through a network, a data request from a computing device associated with a first member of a data exchange system at a processor circuit, the data request including a use specified by the first member;
    automatically determining, using the processor circuit, a data contribution associated with the first member based on first metadata stored to a database;
    automatically retrieving data including a plurality of records from a database according to the data request;
    automatically determining, using the processor circuit, a data access limit for the first member based in part on the data contribution, the data access limit specifying a number of records; and
    determining a second member of the data exchange system that contributed a data element to the data exchange system that is part of the retrieved data;
    further determining the data access limit based on a data sharing limit selected by the second member, the data sharing limit includes a reciprocity value to apply to the data contribution based on an industry type of the first member and based on the use specified by the first member;
    automatically applying a filter corresponding to the data access limit, using the processor circuit, to selectively limit the plurality of records of the retrieved data to produce results data according to the data access limit;
    sending the results data through the network to the computing device of the first member in response to the data request; and
    automatically updating the data access limit based on the results data sent to the computing device of the first member.

9. The method of claim 8, further comprising:
    the data contribution includes an amount of data the first member previously provided to the data exchange system;

the data access limit includes an amount of data to which the first member is permitted access in exchange for the data contribution; and selectively providing the retrieved data to the computing device in response to the data request when the first member has not exceeded the data access limit.

10. The method of claim 8, further comprising:

the data contribution includes a total value of data the first member provided to the data exchange system, wherein a plurality of data categories have a corresponding plurality of values; and the data access limit includes a value of data to which the first member is permitted access in exchange for the data contribution.

11. The method of claim 8, further comprising:

determining the second member of the data exchange system that contributed a data element of the results retrieved data to the data exchange system based on an identifier stored with the retrieved data;

determining the data access limit further based on a data sharing limit selected by the second member; and determining the data access limit includes modifying a value of the data contribution by the data sharing limit.

12. The method of claim 11, further comprising:

determining whether the first member has exceeded the data access limit, including:

determining a number of data accesses by the first member to data provided by the second member; and determining whether the number of data accesses is less than the data access limit.

13. The method of claim 12, further comprising:

providing the results data when the value of the contribution modified by the first and the second reciprocity values is greater than the number of data accesses by the first member.

14. The method of claim 11, further comprising:

determining that the second member permits sharing of reciprocal data with the first member prior to providing the results data in response to the data request.

15. The method of claim 8, further comprising:

determining a list of selected potential data in response to the data request;

determining one or more members of the data exchange that provided the selected potential data;

determining the data access limit for the first member in relation to each of the one or more members;

when the first member has not exceeded the data access limit for a given member of the one or more members, adding the selected potential data from the given member to a results list; and providing the results list to the first member as the results data.

16. An apparatus comprising:

a processor circuit configured to:

receive a data request from a computing device associated with a first member of a data exchange system, the data request including a use specified by the first member;

determine a data contribution associated with the first member, including an amount of data the first member previously provided to the data exchange system by automatically searching a database;

automatically retrieve data including a plurality of data records from a database according to the data request;

determine, automatically, a data access limit for the first member based in part on the data contribution, the data access limit includes an amount of data including a number of records to which the first member is permitted access in exchange for the data contribution, the data sharing limit includes a reciprocity value to apply to the data contribution based on an industry type of the first member and based on a use specified by the first member;

determine a second member of the data exchange system that contributed a data element of the results data to the data exchange system; and determine the data access limit further based on a data sharing limit selected by the second member;

automatically apply a filter corresponding to the data access limit, using the processor circuit, to selectively limit the plurality of data records to produce results data;

send the results data through the network to the computing device associated with the first member in response to the data request; and automatically update the data access limit based on the results data sent to the computing device of the first member.

17. The apparatus of claim 16, wherein the data sharing limit selected by the second member, includes one or more modifier values to apply to a value of the data contribution based on one or more aspects of the data request; and the processor circuit is configured to determine the data access limit includes modifying the value of the data contribution by the data sharing limit.

18. The apparatus of claim 16, wherein the processor circuit is further configured to:

determine whether the first member has exceeded the data access limit, including:

determining a number of data accesses by the first member to data provided by the second member; and determining whether the number of data accesses is less than the data access limit.

19. The apparatus of claim 16, wherein the processor is further configured to send the results data when the value of the contribution modified by the first and the second reciprocity values is greater than the number of data accesses by the first member.

20. The apparatus of claim 16, wherein the processor is further configured to determine that the first member permits sharing of reciprocal data to the second member prior to providing the results data in response to the data request.

* * * * *